(12) United States Patent
Mihai et al.

(10) Patent No.: US 7,876,103 B2
(45) Date of Patent: Jan. 25, 2011

(54) LED CHAIN FAILURE DETECTION

(75) Inventors: Dan Mihai, Pointe-Claire (CA); Mohammed Ammari, Dollard-des-Ormeaux (CA)

(73) Assignee: GE Lighting Solutions, LLC, Cleveland, OH (US)

( * ) Notice: Subject to any disclaimer, the term of this patent is extended or adjusted under 35 U.S.C. 154(b) by 314 days.

(21) Appl. No.: 12/038,443

(22) Filed: Feb. 27, 2008

(65) Prior Publication Data

US 2008/0204029 A1    Aug. 28, 2008

(51) Int. Cl.
*G01R 31/00* (2006.01)
*H01J 7/42* (2006.01)
(52) U.S. Cl. .................. 324/414; 315/129; 315/291
(58) Field of Classification Search .............. 324/414; 315/129–136, 291
See application file for complete search history.

(56) References Cited

U.S. PATENT DOCUMENTS

| 5,663,719 | A | * | 9/1997 | Deese et al. | 340/912 |
| 6,351,079 | B1 | * | 2/2002 | Willis | 315/291 |
| 6,667,623 | B2 | * | 12/2003 | Bourgault et al. | 324/414 |
| 6,963,177 | B2 | * | 11/2005 | Ito et al. | 315/291 |
| 7,262,752 | B2 | * | 8/2007 | Weindorf | 315/291 |
| 7,317,287 | B2 | * | 1/2008 | Blumel | 315/291 |
| 7,635,957 | B2 | * | 12/2009 | Tripathi et al. | 315/291 |

* cited by examiner

*Primary Examiner*—Timothy J Dole
(74) *Attorney, Agent, or Firm*—Fay Sharpe LLP

(57) ABSTRACT

The system consists of an LED failure detection circuit to provide protection against individual LED catastrophic failure. When LED clusters are arranged in a series-parallel configuration, it is important to detect individual LED failure in order to avoid uncontrolled luminous intensity reduction and/or light uniformity degradation. The circuit compares the voltage levels on LEDs with similar position but situated in different chains. In normal conditions, the voltage levels are substantially similar to one another. In case of individual or multiple LED failure, open or shortcircuit, the circuit sends a signal to the automatic turn off circuit that initiates the lamp forced turn off sequence.

8 Claims, 3 Drawing Sheets

LED CHAIN FAILURE DETECTION

BACKGROUND

The present exemplary embodiment relates to light emitting diodes (LEDs). It finds particular application in conjunction with control of the intensity and uniformity of LEDs by indentifying failure conditions, and will be described with particular reference thereto. However, it is to be appreciated that the present exemplary embodiment is also amenable to other like applications.

In many lighting applications, LEDs are selected to provide illumination instead of an incandescent or other conventional illumination sources. Generally, the LEDs are arranged in clusters or arrays to coincide with particular design specifications to provide a desired light output. Because the voltage versus current characteristics of the LED are much like any diode (that is, current approximately an exponential function of voltage), a small voltage change results in a huge change in current. Added to deviations in the process, this means that a voltage source may barely make one LED light while taking another of the same type beyond its maximum ratings and potentially destroying it.

LED clusters can have requirements for intensity and pattern of light output. In general, LED clusters are built with two or more chains of two or more LEDs in series. Each chain can be driven by a power circuit that provides current to each of the LEDs contained therein. In order to meet desired output requirements, it is important to monitor and control the luminous intensity and the light uniformity by supervising each LED chain.

Conventionally, sense resistors are employed to detect current drawn by one or more LED clusters. As known in the art, current drawn by each LED cluster is related to the output and operating status (e.g., open circuit, short circuit, etc.) of the LEDs. Since light output is dependent on proper current, identification of failure down to a single LED in a cluster is desired. However, such a solution can affect overall system efficiency due to significant power dissipation caused by using such sense resistors.

This task becomes even more important when fewer LEDs are utilized in a cluster, wherein a single LED failure can cause luminous intensity and light uniformity that is outside desired parameters. In such applications, the relative power savings of a cluster with a minimal amount of LEDs can be greatly affected by the use of large current consumption devices such as inline sense resistors.

In order to mitigate this effect, the sense resistors must be relatively large to minimize unnecessary power consumption, and is therefore typically external to the LED power circuit. However, this external placement can mandate that the packaging for the LED power circuit includes additional pins to enable measurement of the voltage across the sense resistor. The resulting increase in pin count can preclude the use of smaller, more desirable chip packaging for conventional power circuits.

Accordingly, there is a need for more non-invasive systems and methods to detect single LED failure within an LED cluster.

BRIEF DESCRIPTION

In accordance with one aspect of the present exemplary embodiment, a system detects failure within an LED array that includes a first section with a plurality of LEDs. One or more sections, that include a plurality of LEDs, are coupled to each other and to the first section. A non-invasive monitoring circuit is coupled remotely to each of the sections to monitor at least one of a power, a current and a voltage parameter for each of the sections. A control circuit triggers an output if one or more of the parameters for any one section are greater than a predetermined threshold for the relative parameter value for any other section.

An LED array includes a first chain of LEDs connected in series and one or more chains of LEDs connected in series, wherein each of the one or more chains is connected in parallel to each other and the first chain. A transistor is coupled to each of the chains via a base lead for each through a resistor, wherein each transistor is coupled in parallel to one another. A difference in voltage between each of the chains that is greater than a predetermined threshold causes current to flow through one or more of the transistors. A control circuit is coupled to each of the transistors to trigger an output when current is received from at least one of the transistors.

DETAILED DESCRIPTION

Figure 1:
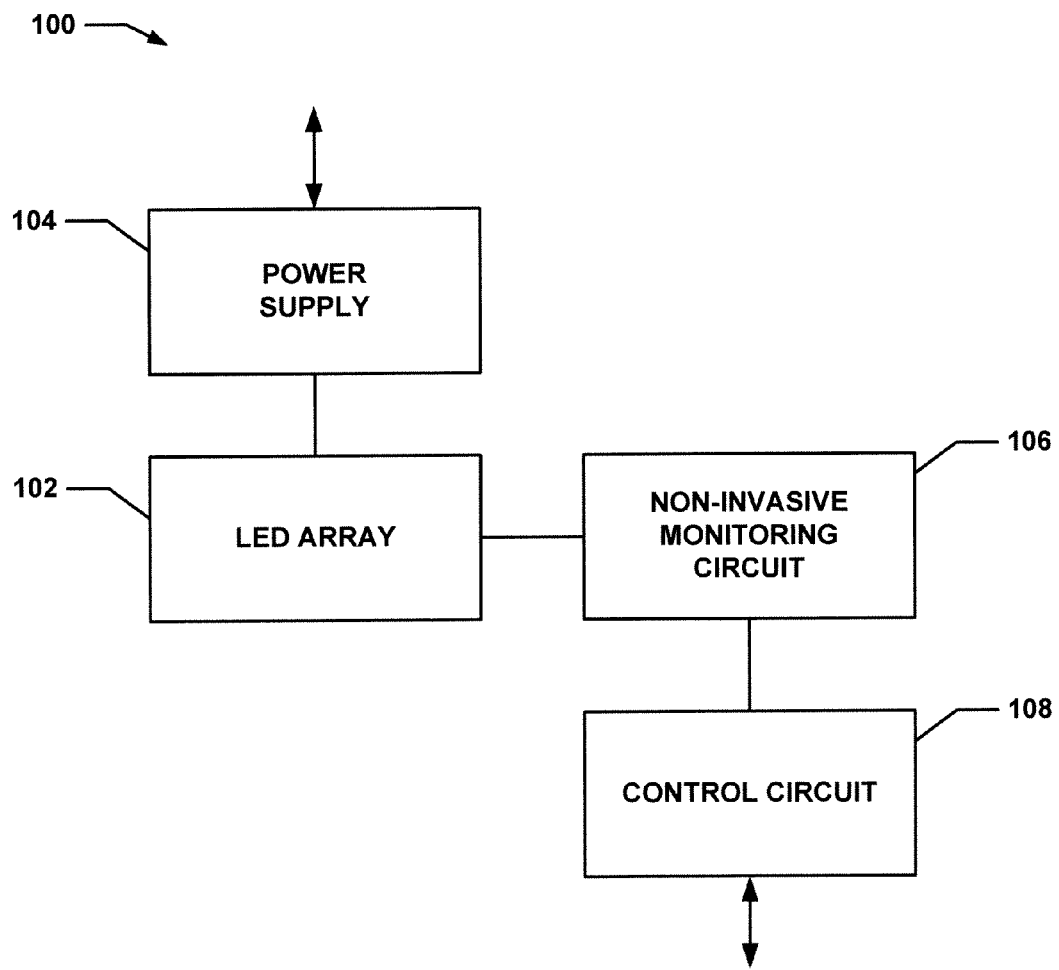
FIG. 1 illustrates a lighting system that detects LED failure via a non-invasive monitoring circuit, in accordance with an aspect of the subject invention.

FIG. 1 illustrates a lighting system 100 that includes an LED array 102 that is energized via a power supply 104. The LED array 102 interfaces with a non-invasive monitoring circuit (NIMC) 106 that monitors one or more aspects of the LED array (e.g., light output, current draw, etc.). A control circuit 108 is coupled to the NIMC 106 to compare values read by the NIMC 106 to one or more predetermined parameters. If the values from the NIMC 106 are outside such predetermined thresholds, the control circuit 108 can provide an output (e.g., to a disparate system, to maintenance personnel, etc.) to provide such indication.

The LED array 102 can include a number of disparate configurations. In one example, the LED array 102 includes a plurality of LEDs connected in series. Power is delivered across the serially connected LEDs via the power supply 104. In a second example, the LED array 102 includes a plurality of serially connected LEDs wherein each serial connection is coupled in a parallel arrangement. Although two examples are provided, it is to be appreciated that the LED array 102 can include any number of combinations of LEDs electrically coupled to each other in a serial and/or parallel fashion.

In addition, the LED array 102 can include LEDs that utilize any number of semiconductor materials to output a particular color of light. Such semiconductor materials can include aluminum gallium arsenide, aluminum gallium phosphide, aluminum gallium indium phosphide, gallium arsenide phosphide, gallium phosphide, gallium nitride, indium gallium nitride, silicon carbide, silicon, sapphire, zinc selenide, diamond, aluminum nitride, aluminum gallium nitride, and aluminum gallium indium nitride. It is to be appreciated that each of these LEDs has unique power requirements that are commensurate with the type of semiconductor material employed.

Although a number of disparate LEDs can be employed within the LED array 102, a pattern of LEDs is generally employed for most applications. That is, throughout the array 102, the number and type of LEDs is generally repeated to provide a desired output. Each of these repeated sections can be grouped wherein each section has a particular power requirement, such as a particular voltage for example. In one example, the LED array 102 can include twenty disparate sections, wherein each section includes three of LED type A and four of LED type B. Further, each LED within the section can be electrically connected in series and each section can be coupled to each other in parallel.

Although, it is expected that each section have an identical power requirement, a difference between sectional power requirements can occur based on manufacturing variation and/or defects. Alternatively or in addition, differences in sectional power consumption can be caused by individual LED failure such as an open circuit or a short circuit condition. Since power consumption is closely related to light output with LEDs, a disparity in power requirement between sections can be an indication that one or more portions of light output from the LED array 102 is outside of predetermined output specifications.

The power supply 104 energizes the LED array 102 by delivering direct or alternating current power to one or more LEDs contained therein. The power supply 104 can receive power from an outside source (not shown) and convert such received power to meet particular requirements. The power delivery requirements are based at least in part upon the number, type of LEDs and/or configuration of such LEDs within the LED array 102.

The NIMC 106 monitors one or more operating parameters of the LED array. Such parameters can include the current, power, voltage, and impedance of the LEDs included in the LED array. Since the voltage is logarithmically related to the current it can be considered to remain largely constant over the LEDs operating range. Thus the power can be considered to be almost proportional to the current. Such parameters can be monitored based on particular groupings of LEDs and/or individual LEDs within the array 102. The NIMC 106 can collect parameter data continuously, periodically (e.g., based on time) and/or based on an event.

Contrary to conventional LED parameter monitoring methods, the NIMC 106 does not substantially affect the functionality of the LED array 102. In one example, the NIMC 106 monitors power drawn from a plurality of sections of the array on a continuous basis. Such monitoring is executed without significantly affecting the power draw of the LED array 102. As a result, the thermal resistance (and therefore the thermal profile) of the LED array 102 is relatively unaffected.

Thermal resistance is the temperature difference across an LED (or other component) when a unit of heat energy flows through it in unit time. Minimizing overall thermal resistance of circuits like the LED array 102 and power supply 104 is important to maintain optimal life expectancy for all components. Further, costs savings can be realized by eliminating the need to provide auxiliary cooling to counteract heat generated by these electrical components. Some electrical components malfunction when they overheat, while others are permanently damaged. Thus, utilizing the NIMC 106 mitigates such deleterious effects since fewer components add to the overall thermal resistance of the LED array 102 and power supply circuits 104.

The control circuit 108 interfaces with the NIMC 106 to take one or more actions when the NIMC 106 provides data. Such action can occur whether the data is outside or within a predetermined range. The control circuit 108 can evaluate information provided by the NIMC 106 via any number of methods such as comparison of received data to a table stored in memory (not shown) that defines parameters for each LED array configuration. In one instance, the control circuit 108 compares data from disparate parts of the LED array 102 in order to evaluate operating parameters. In particular, the control circuit can look at particular sections wherein identical LEDs groupings are employed. As such, the control circuit can determine if a disparity between voltage levels of each section is greater than a predetermined threshold. If so, the control circuit 108 can initiate one or more actions in response such as the shutdown of power delivered to the LED array 102 and/or trigger an output to one or more recipients.

Figure 2:
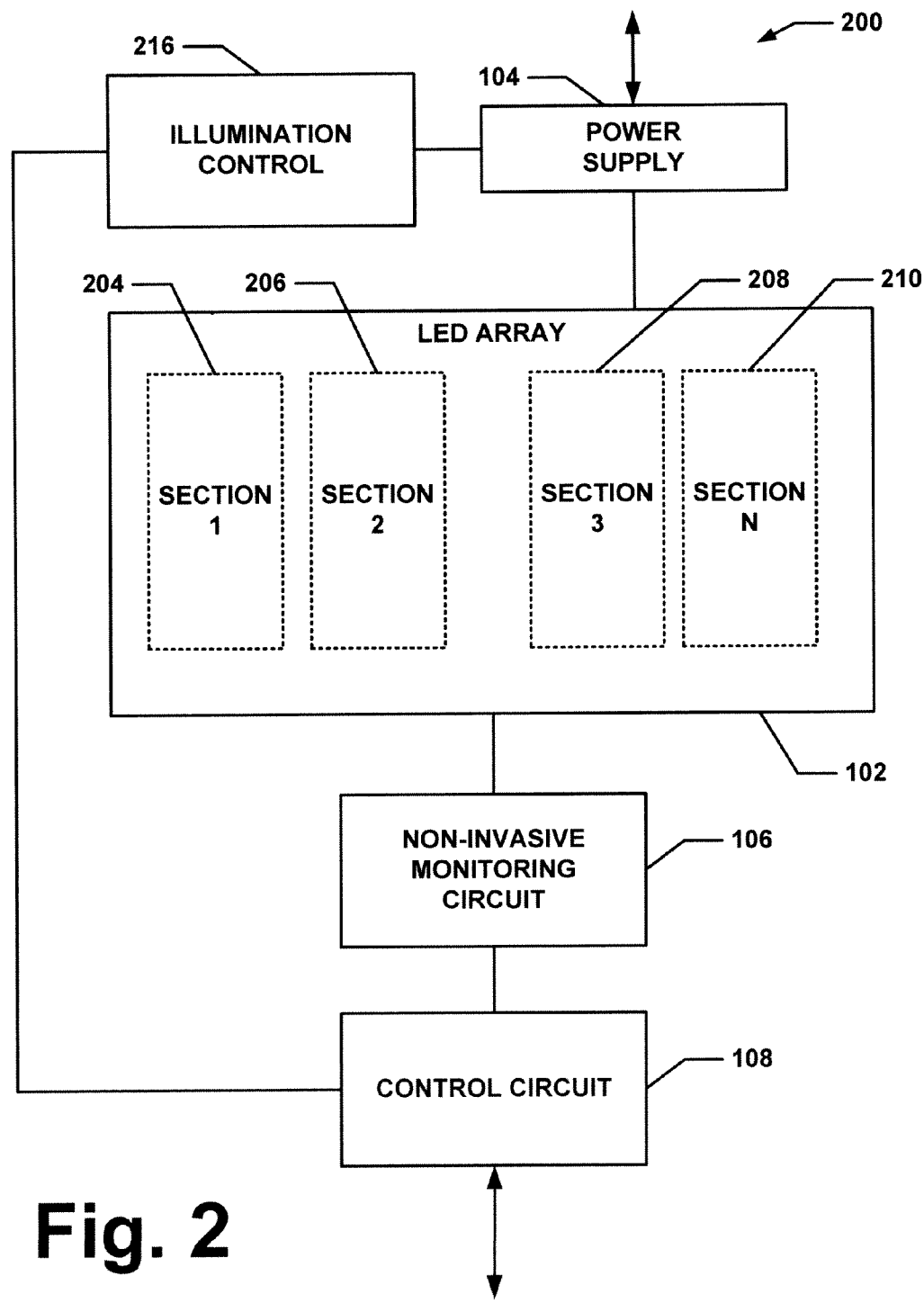
FIG. 2 illustrates a lighting system that detects LED failure within one or more sections of an array via a non-invasive monitoring circuit, in accordance with an aspect of the subject invention.

FIG. 2 illustrates a lighting system 200 which includes an LED array 202 that has three disparate sections 204, 206, 208, and 210. The power supply 104 provides power to each of the sections 204-210 to illuminate the LEDs contained therein. The NIMC 106 scans operating parameters as described above with relation to FIG. 1. The control circuit 108 receives data from the NIMC 106 to provide appropriate response if the lighting system 100 parameters are outside one or more predetermined thresholds and provides such data to the control circuit 108.

An illumination control 216 provides parameters to the power supply 104 to energize the LED array 202 in a desired pattern. The illumination control 216 can receive information from an outside source (e.g., via a user interface, etc.) to accommodate various patterns based on one or more of LED type, LED arrangement, and application of the lighting system 200, and customer specifications, etc.

The illumination control 216 is also coupled to the control circuit 108 in order to provide appropriate response (e.g., system shutdown) in case one or parameters are outside of desired thresholds. In one example, a voltage draw variance between sections 204, 206, 208, and 210 is too large. In another example, the current draw for one or more sections 204, 206, 208 or 210 is outside a predetermined threshold based on a short circuit or an open circuit condition.

Figure 3:
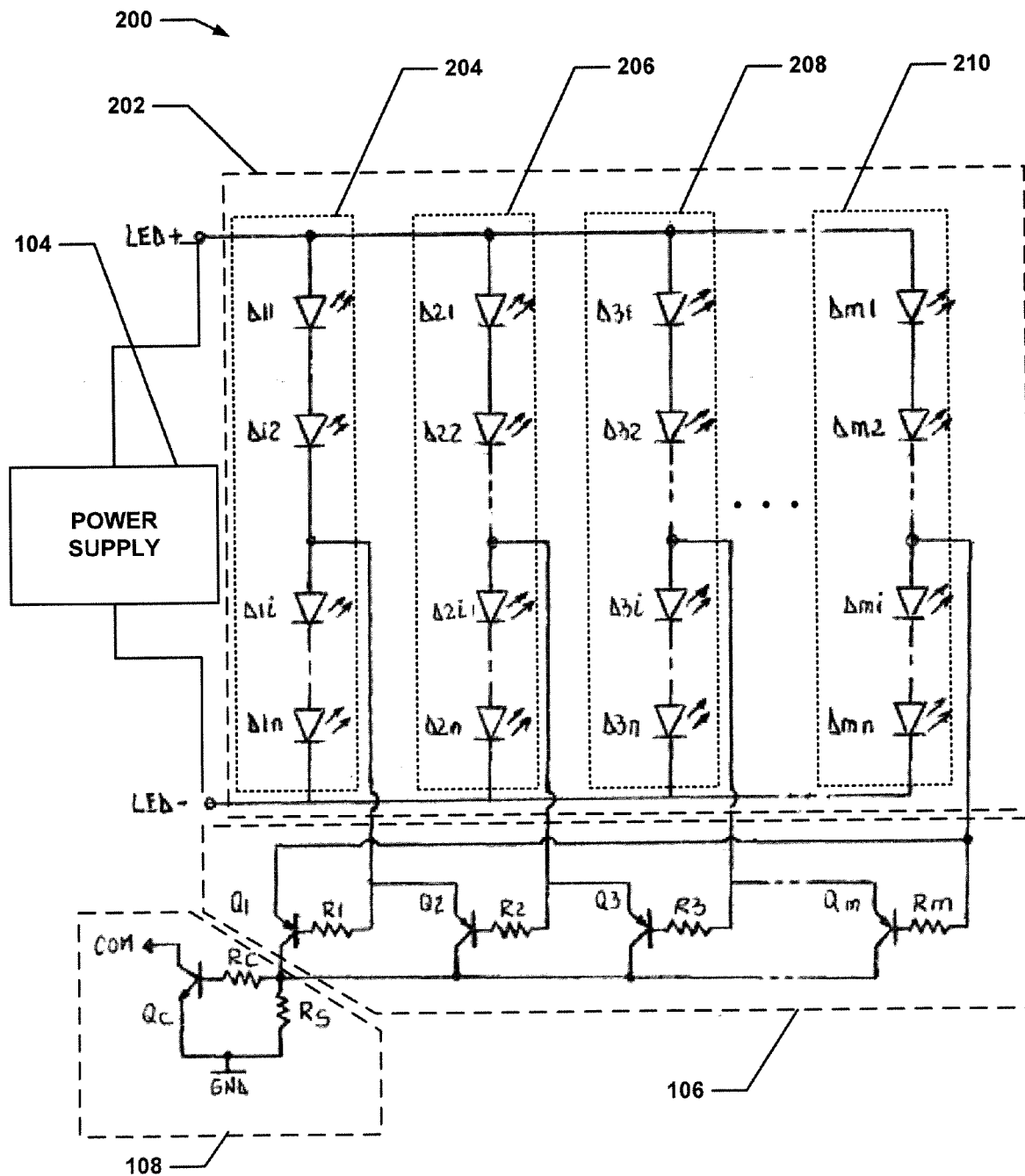
FIG. 3 illustrates a lighting system that detects LED failure within one or more sections of an array via a plurality of transistors, in accordance with an aspect of the subject invention.

FIG. 3 illustrates the lighting system 200 wherein the LED array 202 includes sections 204-210, which are more particularly defined. Each of the sections 204-210 is an LED chain which contains four LEDs in connected in series. In particular, section 204 includes LEDs D11, D12, D1$i$, and D1$n$; section 206 includes D21, D22, D2$i$, and D2$n$; section 208 includes D31, D32, D3$i$, and D3$n$; and section 210 includes Dm1, Dm2, Dmi, and Dmn. It is to be appreciated that although four sections are shown within the LED 202, substantially any number of sections can be employed.

Also, each section can include various arrangements utilizing any number and type of LEDs within each section. However, in order to provide useful feedback, it is desirable to select sections based on one or more common features. In one example, each section has substantially the same power, voltage and/or current draw. In this manner, an alarm can be triggered if one of the sections does not exhibit the same properties as the others.

By monitoring the sections of the LED array 202, the NIMC 106 provides protection against individual LED catastrophic failure. In this example, with LED array 202 in series-parallel configuration, it is important to detect individual LED failure in order to avoid uncontrolled luminous intensity reduction and/or light uniformity degradation. The NIMC 106 monitors the voltage levels on LEDs with similar position but situated in different chains. In normal conditions, it shall be equal or may have small differences due to the LED forward voltage variation from one LED to another. In case of individual or multiple LED failure (e.g., open or short circuit), the control circuit 108 responds to the NIMC 106 and sends a signal to initiate a turn off sequence for the LED array 202.

As illustrated in FIG. 3, the NIMC 106 includes a transistor with a resistor coupled between the transistor base and two pairs of LEDs for each section 204-210. For instance, transistor Q1 and resistor R1 are coupled between the base of Q1 and D11, D12 and D1$i$, D1$n$, etc. It is to be appreciated that a PNP or NPN transistor can be utilized for this purpose. Alternatively or in addition, the resistor values (e.g., for R1, R2, R3, Rm, etc.) can be modified to increase or decrease the sensitivity of the NIMC 106.

In this manner, the NIMC 106 can monitor relative differences between sections with variable parameters. The sensitivity of the transistors Q1 to Qm is dependent on the current level (e.g., voltage across the relative resistors) at the base of each transistor. In this manner, the blocking of the transistors is dependent on the amount of variation that is allowable, which is controlled by the base resistor. Further, as the NIMC 106 is not integral to the LED array 202, it allows the lighting circuit 200 to be power efficient and further, does not impact the thermal management analysis.

The principle is to detect the voltage imbalance between two LED chains due to individual LED failure, open or short-circuit. The PNP transistors Q1 to Qm are used as detectors wherein the base-emitter junction sets the threshold. Each of the sections 204-210 is monitored by two transistors in order to detect higher or lower voltage level with respect to its peers. Thus, the voltage level of sections 204 and 210 are compared to insure that any difference is below a preset threshold. It is to be appreciated that the other sections are compared to at least one other section as illustrated.

If the voltage levels for each of the sections 204-210 are balanced, then the transistors Q1 to Qm are blocked and the NIMC 106 does not provide any indication that an action is required from the control circuit 108. In this case, the resistor Rs of the control circuit 108 grounds transistor Qc's base, which is also blocked. As a result, the control circuit 108 receives an open-collector signal which does not trigger a response. This is an exemplary no fault condition since the voltage level for each section is relatively equal to signify no open or short circuit conditions and thus, no LED failure within the array 202.

However, if there is a voltage imbalance between two sections that exceeds the transistors Q1 to Qm base-emitter voltage threshold, one transistor will be in conduction (e.g., saturation) mode and current will flow through the resistor Rs. The transistor Qc of the control circuit 108 is driven and causes an alarm signal to be output to indicate a fault has occurred. In one embodiment, the system is employed with traffic signals with two or more LED chains and with different LED package solutions.

In this example, the LED array 202 is symmetrical and the behavior is similar regardless of the section that is tested. Two exemplary main LED failures are presented. In a first example, D12 open and there is no current flow in the section 204. The LEDs connected below D12 will be polarized through the cell Q1-R1. Transistor Q1 has the base-emitter junction direct polarized and starts conducting. The current flows through Rs resistor and drives transistor Qc of the control circuit 108 to initiate an output to report a fault condition.

In a second example D12 is short-circuited and, as a result, the section 204 draws a larger current than the sections 206, 208 or 210. The individual LED forward voltage in the section 204 increases and it decreases simultaneously for the other sections 206, 208, and 210 thereby generating voltage imbalances between the sections. Transistor Q2 has the base-emitter junction direct polarized and starts conducting. The current flows through Rs resistor and drives transistor Qc of control circuit 108 to trigger an output which can report a fault. Alternatively or in addition, the NIMC 106 is able to detect abnormal chains current sharing due to the LED bin voltage mix.

The exemplary embodiment has been described with reference to the preferred embodiments. Obviously, modifications and alterations will occur to others upon reading and understanding the preceding detailed description. It is intended that the exemplary embodiment be construed as including all such modifications and alterations insofar as they come within the scope of the appended claims or the equivalents thereof.

The invention claimed is:

1. A system that detects failure within an LED array, comprising:
   a first section that includes a plurality of LEDs;
   one or more sections that includes a plurality of LEDs wherein one or more of the LEDs are coupled to each other and to the first section;
   a non-invasive monitoring circuit that is coupled remotely to each of the sections to monitor at least one of a power, a current and a voltage parameter for each of the sections; and
   a control circuit that triggers an output if one or more of the parameters for any one section is greater than a predetermined disparity threshold from the relative parameter value for any other section.

2. The system according to claim 1, wherein the LEDs within each section are connected in series.

3. The system according to claim 1, wherein each section is connected in parallel to every other section.

4. The system according to claim 1, wherein the LEDs in each of the sections utilize the same number and the same type of LEDs, wherein the LEDs are coupled to each other in substantially the same arrangement.

5. The system of claim 1, wherein the non-invasive monitoring circuit includes a transistor-resistor pair coupled to each section, wherein each transistor-resistor pair is coupled in parallel to each other.

6. An LED array, comprising:
   a first chain of LEDs connected in series;
   one or more chains of LEDs connected in series, wherein each of the one or more chains is connected in parallel to each other and the first chain;
   a transistor coupled to each of the chains via a base lead for each through a resistor, wherein each transistor is coupled in parallel to one another;
   wherein a difference in voltage between each of the chains that is greater than a predetermined disparity threshold causes current to flow through one or more of the transistors; and
   a control circuit that is coupled to each of the transistors, that triggers an output when current is received from at least one of the transistors.

7. The LED array according to claim 6, also includes a power supply that receives and converts power from an outside source to energize the LEDs within the array.

8. The LED array according to claim 7, wherein the control circuit output is sent to the power supply to initiate a power down sequence for the LED array.

* * * * *